W. E. WARD.
Nut Machine.
No. 2,434. Reissued Jan'y 1, 1867.
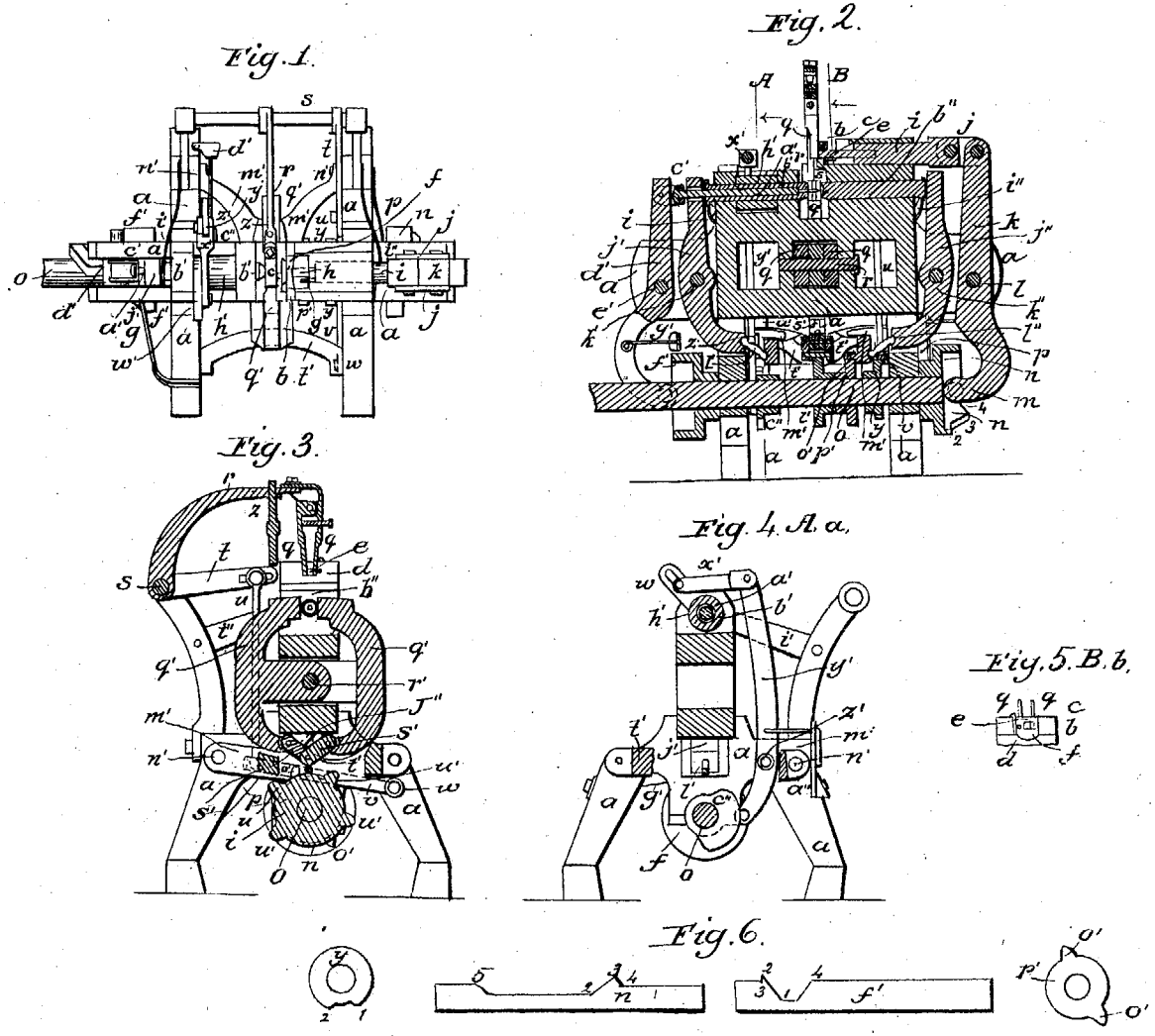
Witnesses:
Wm H. Babcock
Chas. A. Wilson
Inventor
W. E. Ward.
N. PETERS, Photo-Lithographer, Washington, D. C.

United States Patent Office

WILLIAM E. WARD, OF PORT CHESTER, NEW YORK.

*Letters Patent No.* 15,861, *dated October* 7, 1856; *reissue No.* 2,434, *dated January* 1, 1867.

IMPROVEMENT IN MACHINES FOR MAKING NUTS.

The Schedule referred to in these Letters Patent and making part of the same.

TO ALL WHOM IT MAY CONCERN:

Be it known that I, WILLIAM E. WARD, of Port Chester, Westchester county, and State of New York, have invented certain new and useful improvements in the Machine for Cutting, Punching, and Forging, or Swaging Nuts or Washers; and I do hereby declare that the following is a full, clear, and exact description thereof, reference being had to the accompanying drawings, making part of this specification, in which—

Figure 1 is a plan or top view of the machine.

Figure 2, a longitudinal vertical section in the plane of the axis of the mandrels which hold the nut during the operation of forging or swaging.

Figure 3, a cross vertical section passing through the hammers or swages.

Figures 4 and 5, cross vertical sections taken at the lines A *a* and B *b*, of fig. 2, and looking in the direction of the arrows; and Figure 6 represents separate views of such of the cams as do not clearly appear in the other figures.

The same letters indicate like parts in all the figures.

In my said machine, the nut-blanks are formed from a bar of heated iron of suitable size, which is presented to the face of a die, and in succession pushed forward against a gauge by an operator. A nut-blank is cut off from the end of the bar by a punch and die of the form of the circumference of the nut, and as this is forced through and discharged by the continuation of the same motion, and by another and parallel punch, the hole is punched in the bar for the next nut-blank. As the nut-blanks are in succession discharged from the die in which they are cut, they are taken by a pair of jaws and transferred to and held in front of a central mandrel, which is forced into the central hole thereof, to hold it during the after operations. The punched and cut nut being thus held by the mandrel, it is swaged on the two faces by sliding swages, which are operated in the line of the axis of the mandrel, and it is also forged on the edges by two hammers, which work in opposite directions and simultaneously and at right angles to the axis of the mandrel, which is occasionally turned to present the several faces of the nut to the action of the hammers, whether the nuts be square, hexagonal, octagonal, or of other number of sides, or if round to present in succession the several parts of the circumference.

In the accompanying drawings, *a* represents a frame, which may be of any suitable form, with a cross-channel *b* made in the upper part, in which the bar of heated iron, from which the nuts are to be cut, is presented and held by the attendant. In one of the vertical faces of this channel is fitted the die, *c*, which is held in place by a key or other suitable means. This die is formed with two apertures side by side, (see fig. 5,) the one, *d*, round and of the size of the central hole in the nuts to be made, and the other, *e*, square and a little larger than the intended size of the nuts. The holes in the dies are extended through the solid part of the metal in which the die is embedded, as shown in fig. 3, where they are indicated by the same letters as the holes in the die. There is a stop or gauge, *f*, projecting from the face of the die, and at one edge of the square hole, *e*, against which the attendant pushes the end of the rod at each punching and cutting operation to gauge the required position of the rod or bar of iron. There are two punches, *g* and *h*, corresponding in size, form, and position with the holes in the die, and these punches are both fitted (in any suitable manner to admit of being changed) to the forward end of a metallic stock, *i*, adapted to slide longitudinally and accurately in one of the head-stocks of the frame, so that the punches will move accurately in the line of the corresponding holes in the die. The outer end of the stock *i* is connected by strong joint links, *j j*, with the upper arm of a strong lever, *k*, which turns on a fulcrum pin, *l*, and the lower arm of this lever has a strong projecting wrist or pin, *m*, which is made to bear against the face of a rim cam, *n*, on the end of the cam-shaft, *o*, by the tension of a spring, *p*, linked to the lower arm of said lever. This cam is represented as developed at *n*. in fig. 6, and as this cam rotates and its face, from 1 to 2, passes by the wrist or pin *m*, the punches are held stationary at their greatest distance from the die, so that the attendant can push the end of the bar of iron against the gauge *f*; the face of the cam then rises in a gradual plane, from 2 to 3, to force the square punch through the bar of iron and into the square hole of the die to punch out a piece of iron of nearly the size of the intended nut and force it through the hole to discharge it on the other side, where it is received and transferred to the after operations, in manner to be hereinafter described. The same action forces the round punch through the bar of iron, to punch the round hole for the next nut to be cut off at the next operation. The cam, from 3 to 4, recedes for the purpose of drawing back the punches so far that the bar of iron can be pushed between the die and the round punch and against the square punch, to gauge the place where the first round hole is to be punched in the end of a fresh bar. From the point 4 to 5 the cam retains the punches in a fixed position, and from 5 to the place of beginning the face of the cam recedes to draw back the punches to their utmost rear position. After the first hole has been punched in a bar, the attendant, at the subsequent operations, pushes the end of the bar against the gauge *f*, before described. In this way the whole length of the bar is made use of. As the square punch cuts off one nut, the round punch punches the central hole in the bar for the nut to be cut off at the next operation by the square punch; but if the bar at the commencement was pushed against the gauge *f*, the first piece cut off would be without a central hole; this I avoid by giving to the punches a rest in their back motion, so that when a fresh bar is introduced the attendant can make use of the square punch as a gauge, by which to set the bar for the punching of the first hole. As the punched nut-blank is discharged in front by the second motion of the square punch, it is forced between and held by a pair of spring-jaws, *q*, on the end of an arm, *r*, on a rock-shaft, *s*, which is provided with another arm, *t*, connected by a joint link, *u*, with the outer end of a lever, *v*. This lever turns on a fulcrum pin at *w*, and is provided with a pin, *x*, (see fig. 2,) which rests on the periphery of a cam, *y*, on the cam-shaft, *o*. The form of this cam, represented at *y*, fig. 6, is concentric from the point 1 to 2 to hold up the spring-jaws in front of the square hole through which the cut nut-blank is discharged, and from 2 to 1 there is a depression to permit the jaws to descend by the gravity of the parts to carry the nut-blank down to the required position for the insertion of the mandrel in the central hole thereof. The extent of the downward motion of the spring-jaws is gauged by a gauge set-screw, *z*, tapped into the arm *r* of the jaws, and the head acts as a gauge by coming in contact with the head of one of the hammers to be presently described; but the motion may be gauged in any other manner. So soon as the nut-blank is carried down by the spring-jaws, the mandrel *a'* is forced into its central hole to hold it, and the jaws are then lifted up out of the way of the hammers and to their original position preparatory to receiving another nut-blank. The end of the mandrel *a'*, which fits into the central hole of the nut, is pointed, and back of the point slightly tapering, so that it may enter the hole freely and hold the nut when forced in. Back of this part, the mandrel is of an enlarged size and cylindrical, and passes through and slides freely but accurately in one of the hollow cylindrical face swages, *b'*, to be presently described. And the back end of this mandrel is connected by a joint-link, *c'*, with the end of the upper arm of a lever, *d'*, that turns on a fulcrum pin, *e'*, the end of the lower arm being provided with a wrist or pin, which by the tension of a spring, *g'*, is made to bear against the face of a rim cam, *f'*, on the cam-shaft, *o*, by which the lever is operated to work the mandrel. The form of this cam is represented as developed at *f'*, in fig. 6. From the point 1 to 2 it presents a plane inclined to the plane of rotation to force the mandrel into the hole of the nut-blank, and from 2 to 3 it is slightly depressed to draw back the mandrel and bring the nut-blank in line between the hammers (to be presently described) which forge the edges and then from the point 3 to 4 the said cam is in the plane of rotation to keep the nut in place; and from 4 the face of the cam recedes to the place of beginning to draw the mandrel out of the nut-blank by which it is discharged. The sleeve *b'* which surrounds the mandrel is a hollow cylinder, fitted to slide accurately but freely on the mandrel, and within a rocking-sleeve shaft, *h'*, mounted in suitable boxes in one of the heads of the frame. The mandrel is feathered to the sleeve *b'*, which is in turn feathered to the rocking-sleeve shaft *h'*, so that the turning of the rocking-sleeve shaft *h'* will turn the mandrel, which is swivelled to the link which connects its rear end with the lever, by which it is moved longitudinally. The inner end of the sleeve *b'* is made of a form the reverse of the face of the intended nut, and constitutes the swage or face of the hammer for swaging or forging one face of the nut. Back of this sleeve or face swage, and in line with it, there is another and corresponding swage, *b''*, adapted to slide longitudinally and freely, but accurately, in the other head-stock of the frame, and the face of this swage is made of the same form with the other, or of any other form to suit the intended form of the nuts to be manufactured, and there is a central hole in the face of this swage to receive the point of the mandrel, and the face of this swage presents resistance to the nut-blank when the mandrel is forced into it. It is on this account, also, that the mandrel is drawn back a short distance after it is inserted in the nut-blank, that the face of the nut may be withdrawn from the face of the said swage. The two swages, *b'* and *b''*, are drawn apart by the tension of springs, *i' i''*, acting each on a collar on the outer end of each of the swages, and they are forced towards each other to swage or hammer the faces of the nuts by means of two levers, *j' j''*, one at each end of the machine. These levers turn on fulcrum pins, *k' k''*. Their upper arms bear against the outer ends of the swages and their lower arms are acted upon by two pintles, *l' l''*, with rounded ends. One end of each is fitted to a socket in the inner face of one of the lower arms of each lever, and the other end to a socket in each outer face of a forked lever, *m'*, which vibrates on journals, *n' n'*. This forked lever is lifted and depressed twice in each rotation of the cam-shaft, *o*, by two cam projections, *o' o''*, on opposite sides of a cam-wheel, *p'*, on the shaft, *o*, and the working of this forked lever by means of the interposed pintles makes them act in the manner of a toggle-joint lever to operate the levers *j' j''* to work the swages. At right angles to the line of motion of the face swages *b' b''*, are two hammer levers, *q' q'*, that turn on a fulcrum pin, *r'*. These hammer levers are placed one on each side of the mandrel, and the inner faces of their upper arms are made of the form required for hammering the edges of the nuts. Their lower arms are curved inwards above the cam-shaft *o*, so as to be within a short distance, and they are both connected by joint-links *s' s'*, with the end of a forked lever, *t*, which is lifted four times in each rotation of the cam-shaft *o*, by tappets, *u'*, on the periphery of a wheel, *v'*, on the said shaft *o*. The lifting of the forked lever *t'*, causes the joint-links, *s' s'*, to act in the manner of toggle-joint levers on the levers *q' q'* to hammer the edges of the nut. The four tappets *u'* are arranged in pairs, the spaces between the two pairs being greater than the spaces between the two constituting each pair. The object of the greater space between two of them, is to give time for the action of the feed motion and the space opposite to give time for the action of the tappet $a'$ on the cam $p'$. The sleeve rock-shaft $h'$, which is outside of and concentric with the mandrel, is provided with an arm, $w'$, connected by a joint-link, $x'$, with one arm of a lever, $y'$, which turns on a fulcrum pin, $z'$, the other arm being so formed as to be borne by the tension of a spring, $a''$, against the periphery of a cam, $c''$, on the cam-shaft, $o$, and the form of this cam is such as to turn the sleeve-shaft, and with it the mandrel and nut, a quarter of a revolution and back during each rotation of the shaft $o$, and in the periods of time to be described. The succession of operations is as follows, viz: the nut-blank is punched, cut off, forced into the spring-jaws, and the spring-jaws depressed to bring the nut-blank with its central hole in the required position, the mandrel pushed forward into the nut, the face swage $b''$ making resistance. The mandrel is then drawn back a short distance to remove the nut-blank from the face of the swage $b''$ and in line with the side hammers, which are then operated to strike each a blow on the opposite edges of the nut and retire. The nut is then turned a quarter of a revolution by the rock sleeve-shaft; the two hammers then strike each a blow and retire. The two face swages are then forced up against the two faces of the nut and retire; then the two side hammers strike each a blow; the nut is again turned a quarter revolution, and again the two side hammers strike each a blow and retire, and the two face swages are again forced up to complete the swaging of the faces of the nut; and as they retire, the mandrel is drawn back within the sleeve swage $b'$, by which the nut is discharged and the machine left in the condition to repeat the series of operations.

I have described the faces of the two side hammers as being flat and parallel to strike on opposite sides of the edges of the nut, so that by turning the nut one quarter of a revolution and again operating the hammers, the four faces on the circumference of the nut are hammered. But it will be obvious that by simply changing the form of the cam $c''$, the nut can be forged with a greater number of sides, such as hexagonal or octagonal, so long as the polygon is of an even number of sides. But I have contemplated making the faces of each of the two hammers to represent two faces of the polygon of the nut; as for instance, for square nuts the face of each hammer will represent the two sides of a right angle triangle, so that when the two hammers are brought together they will enclose the four sides of the nut. This will have the effect more thoroughly to compact the iron. In that case, however, it will be necessary to so form the cam $c''$ as to turn the mandrel with the nut one-eighth of a revolution so soon as the nut is left on the mandrel by the spring-jaws, so as to present the angles of the nut to the action of the hammers and then to give the other movements as above described. Or instead of turning the mandrel a quarter of a revolution, the same result may be obtained by a change of position of the spring-jaws. For octagonal nuts, the two hammers may be made each with two faces representing two sides of the octagon, in which case, the motions of the mandrel fully described above will be sufficient. And for polygonal nuts, it will only be necessary to modify the form of the cam, $c''$, to suit the number of sides and the form of the faces of the hammers. In whatever form, however, the nuts are to be forged, the punch and the die which cut the nut-blanks from the bar should be of a corresponding form, to avoid the necessity of too much hammering and swaging. It will be obvious that washers can be forged in the above-described machine as well as nuts; and that if desired, round nuts or washers can be forged as well as of the forms specified, by changing the form of the faces of the side hammers.

I do not wish to be understood as limiting my claim of invention to the special form of construction or arrangement of the several parts, as the same mode of operation may be obtained by the substitution of equivalents.

I claim as new, and as my invention, the two punches arranged side by side, and operated substantially as described, for punching the central hole, cutting off the blanks from the bar, and discharging the same, substantially as described, in combination with the two holes or two dies, so that a hole is punched in the bar for another nut during the continued motion of the punch to discharge the nut which was cut off during the previous part of the same motion.

I also claim, in combination with the punching and cutting mechanism, or either, and with the mandrel or its equivalent, for entering the central hole of the nut-blank, the employment of the spring-jaws or the equivalents thereof, for transferring the nut-blank from the die to the mandrel and there holding it until the mandrel enters the hole, substantially as described.

I also claim the mandrel for holding the nut-blank, in combination with the swaging surfaces by which the faces of the nut are formed, substantially as described.

I also claim, in combination with the mandrel for holding the nut-blank, substantially as described, the hammers for hammering or swaging the edges of the nut, substantially as described.

And finally, I claim the combination of the swaging surfaces, for forming the faces of the nut, with the hammers for forging the edges of the nut, substantially as specified, and for the purpose set forth.

W. E. WARD.

Witnesses:
WM. H. BISHOP,
ANDREW DE LACY.